United States Patent Office 2,906,107
Patented Sept. 29, 1959

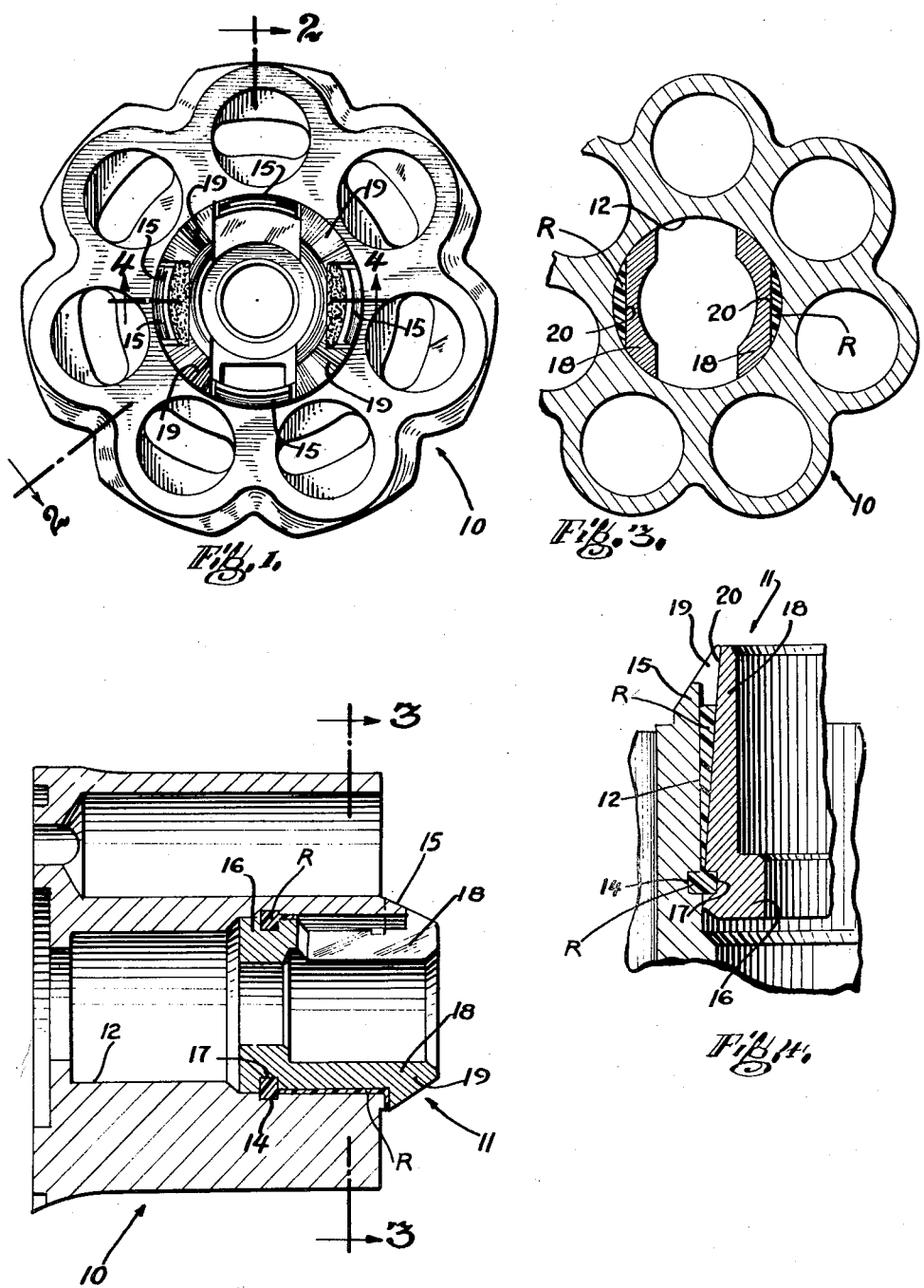

2,906,107

ROTARY RESILIENT COUPLING

Walter G. Sylvester, West Caldwell, N.J., assignor to Specialties Development Corporation, Belleville, N.J., a corporation of New Jersey Application December 19, 1955, Serial No. 554,079

1 Claim. (Cl. 64—27)

The present invention relates to couplings, and, more particularly, to rotary couplings of the type subjected to sudden torque changes and torque fluctuations encountered, for example, in the drive of a high speed, multistage air compressor such as shown in United States Patent 2,562,954.

In such compressors, the torque imposed on rotatively connected parts of the drive therefor is constantly fluctuating in the compression cycle from one stage to the other. While this has been remedied in part by the circumferential arrangement of the stages with respect to each other and proper drive cam design, metallic parts in the drive for transmitting power to drive the cam shaft cannot withstand prolonged periods of continuous operations without structural failure, particularly, if the connected parts are formed of dissimilar metals. Such failures occur most frequently at a point where a portion of one part or member extends into a central recess or bore of another member and the members are formed with means to provide a driving connection. Also, such failures are induced because the compressor may be operating unloaded and may be suddenly put under full operating load.

Attempts have been made to overcome these difficulties for the past few years, but none of these attempts have succeeded. These attempts included forming the inner member with ears broached into the outer member and forming the members with a splined connection of a special design. In all cases, the connection eventually failed, because the torque changes were imposed upon the surfaces of one member by the surfaces of the other member in contact therewith. The forces so imposed had the same effect as constantly hammering one member with the other, whereby either one or both members were coined or "Brinelled" and thus rendered brittle at the contacting portion thereof. Such brittleness resulted in fracture of the ears or splines and impaired the connection between the members.

It has also been attempted to solve this problem by the selection and control of the physical characteristics of the metals, but this only slightly delayed eventual and inevitable fracture.

Accordingly, the primary object of the present invention is to overcome the foregoing difficulties in a simple, practical and economical manner, whereby couplings of the character indicated herein are not degraded by the affects of sudden torque changes and constant torque fluctuations at high frequencies and thus have a long useful life even when subjected to such rough normal usage.

Other and further objects of the invention will be obvious upon an understanding of the illustrative embodiment about to be described, or will be indicated in the appended claim, and various advantages not referred to herein will occur to one skilled in the art upon employment of the invention in practice.

In accordance with the present invention, it has been discovered that the foregoing can be accomplished by depositing a mass of material in the clearance between adjacent portions of a pair of rotary coupling members disposed in torque transmitting relationship, which material has the characteristics of cured epoxy resins and forms both a bond and a cushion between the members, whereby hammering of one member with the other and resulting embrittlement of one or both of the members are eliminated.

Such resins have been found suitable primarily because they have a cushioning effect and yet form a good bond and have a high shear strength. For example, a number of epoxy base resins are available which have a shear strength at about 70° F. of about 8000 p.s.i., when cured, and form a joint between the coupling members which is greater than the shear strength of metallic joints formed of chrome nickel steels. This shear strength increases at lower temperatures and diminishes at higher temperatures. For example, the resin has a minimum shear strength of about 4000 p.s.i. at about 70° F. after being maintained at a temperature of about 300° F. for one year, which shear strength is well in excess of that normally required.

Such epoxy resins further have the advantages of not flowing from the clearances in which a mass thereof is confined during curing, having curing temperatures of a value which will not adversely affect the metallic members, and being unaffected by and resistant to oil and hydraulic fluids coming in contact therewith.

Since epoxy resins are generally available from many sources of supply under that name, it is deemed unnecessary to describe the specific formulation thereof. Such resins generally are obtained by the condensation of phenol, acetone and epichlorohydrin. The repeating unit of the polymer is believed to have the structure

The resins most suitable to accomplish the purpose of the present invention are of 100% solids, thixotropic type having a buttery viscosity before curing and on curing become a non-porous resinous mass having the foregoing desirable characteristics.

A preferred embodiment of the invention has been chosen for purposes of illustration and description, and is shown in the accompanying drawing, forming a part of the specification, wherein:

Fig. 1 is an end view of a rotary coupling embodying the present invention.

Fig. 2 is a sectional view taken along the line 2—2 on Fig. 1.

Fig. 3 is a sectional view taken along the line 3—3 on Fig. 2.

Fig. 4 is a fragmentary sectional view taken along the line 4—4 on Fig. 1.

Referring to the drawing in detail, there is shown a portion of a drive for a multistage air compressor adapted to be rotated at a speed of about 3750 r.p.m. This drive, by way of example, includes a Phosphor bronze driving member 10 and a steel driven member 11 which members are coupled together in the manner about to be described.

The outer or driving member 10 has a central bore or recess 12 formed with an annular groove 14 (Figs. 2 and 4), and has four arcuate tabs 15 spaced circumferentially about the open end of the bore (Figs. 1, 2 and 4).

The inner or driven member 11 is illustrated herein as a sleeve-like universal link retainer which has an apertured circular base 16 (Figs. 2 and 4) formed with an annular groove 17 facing the groove 14 and which has a pair of divided arcuate fingers 18 supported by the base and formed by diametrically slotting the sleeve-like section of the retainer (Fig. 3). The fingers are each formed with an enlarged section 19 at the free end thereof. Each of these sections has a flat longitudinal recess 20 at the midpoint thereof which decreases in depth towards the base of the retainer (Fig. 4) and is adapted to receive one of two opposite tabs 15 of the member 10. The enlarged sections 19 in this manner are divided into four distinct portions each of which is positioned between adjacent tabs (Fig. 1).

The grooves 14 and 17 and the recesses 20 form clearances in which a mass R of the epoxy resin is deposited (Figs. 2, 3 and 4) which upon curing establishes the coupling bond between the members 10 and 11.

In order to illustrate a practical application of the present invention, a coupling as shown herein was used in connection with a four c.f.m. four-stage air, 3000 p.s.i., compressor operated at 3750 r.p.m. The coupling bond was formed by depositing the resin in the clearances as indicated and heat curing the resin at about 285° F. for about five hours. The coupling was then assembled in the compressor drive, and the compressor was operated continuously for 250 hours at the aforementioned rating and under the same conditions, whereas the prior couplings of similar design, but without the resin bond, failed in between 20 and 100 hours.

The coupling in accordance with the present invention withstood this test without failure of metallic parts, and, upon dismantling the drive and examination of the coupling members, the resin joint, as well as the metallic parts, were found to be intact. Metallurgical investigation of the portions of the members 10 and 11 most likely to show signs of embrittlement revealed no such effect, thus demonstrating that the cause of prior failures had been eliminated by the resin cushion.

The member 10 was then placed in a vice and a torque of about 25 ft.-lbs. was applied to the member 11 by means of its universal link without disrupting the bond, thereby further demonstrating the tenacity and permanence of the resin bond. Heretofore, like couplings (without the resin bond) were unable to withstand such torque values.

It was also observed that the resin did not flow into the slot between the fingers 18 during curing or was otherwise extruded from the clearances where deposited in joining the members. The surface area within this slot was maintained entirely free of resin to permit proper functioning of the universal link such as a "dog bone" (not shown).

Apparently, any hydraulic fluid which might have seeped into the clearances had no degrading effect on the cured resin.

From the foregoing description, it will be seen that the present invention provides a coupling suitable for use in a drive of the type indicated which can withstand the conditions under which prior couplings have failed.

While the present invention has been illustrated and described in connection with a drive coupling of a specific design by way of example, it will be understood that the epoxy resin bond can be employed successfully in other couplings subjected to similar operating conditions, and that the present discovery is not to be limited in any manner whatsoever by the specific disclosure herein.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

Cushioning and securing elements for first and second metallic rotary coupling members driven at high speeds and subject to torque changes and fluctuations, the first member having an axial bore into which the second member extends and the members having adjacent surfaces disposed in torque transmitting relationship and having clearances between the surfaces, including opposite grooves and wedge-shaped recesses in one of the members extending in an axial direction to the grooves, said elements consisting of a mass of cured epoxy resin filling the clearances and assuming the shape thereof and serving to prevent hammering of one member with the other and the resulting embrittling of the members at the surfaces thereof and eventual fracture, said resin being further characterized in that it does not flow during curing and is thereby confined to said clearances, is not affected by hydraulic fluids coming in contact therewith, has a minimum shear strength at about 70° F. of 4000 p.s.i. after being maintained at a temperature of about 300° F. for about a year and remains effective at such operating temperatures for long periods, and has a combined cushioning and bonding effect capable of absorbing torque changes and fluctuations, said resin in the grooves serving to hold the members against axial displacement and said resin in the recesses and the grooves serving to couple the members for rotation with each other.

References Cited in the file of this patent
UNITED STATES PATENTS

| | | |
|---|---|---|
| 2,121,819 | Oles | June 28, 1938 |
| 2,174,223 | Frauenthal et al. | Sept. 26, 1939 |
| 2,199,926 | Sweenes | May 7, 1940 |
| 2,251,126 | Gatke | July 29, 1941 |
| 2,260,567 | Gatke | Oct. 28, 1941 |
| 2,564,826 | Yoder | Aug. 21, 1951 |
| 2,671,488 | Christensen | Mar. 9, 1954 |
| 2,761,296 | Baker | Sept. 4, 1956 |